Feb. 13, 1923.　　　　　　　　　　　　　　　　　　　　1,445,284

L. BELL ET AL
PERISCOPIC SYSTEM
Filed Mar. 21, 1918　　　　2 sheets-sheet 1

FIG. 5ª.

Inventors
LOUIS BELL
C.A. ROBERT LUNDIN
By　　　Attorney

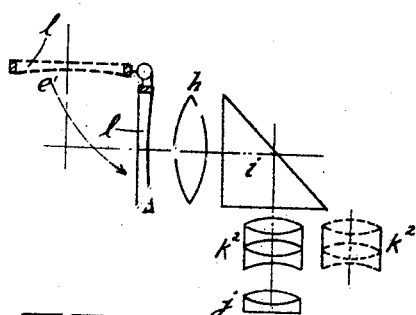
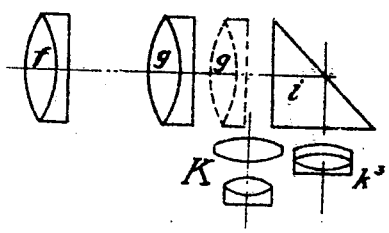
FIG. 6.   FIG. 7.
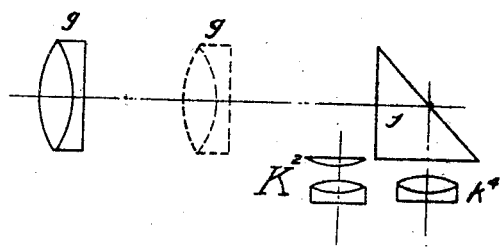
FIG. 8.
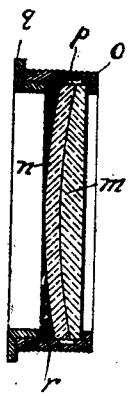
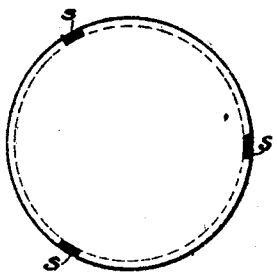
FIG. 9.   FIG. 10.
Inventors
LOUIS BELL
C. A. ROBERT LUNDIN Patented Feb. 13, 1923.

1,445,284

UNITED STATES PATENT OFFICE.

LOUIS BELL, OF WEST NEWTON, AND CARL A. ROBERT LUNDIN, OF CAMBRIDGE, MASSACHUSETTS.

PERISCOPIC SYSTEM.

Application filed March 21, 1918. Serial No. 223,845.

*To all whom it may concern:*

Be it known that we, LOUIS BELL and CARL AXEL ROBERT LUNDIN, citizens of the United States, residing at West Newton, county of Middlesex, Commonwealth of Massachusetts, and Cambridge, county of Middlesex, Commonwealth of Massachusetts, respectively, have invented certain new and useful Improvements in Periscopic Systems, of which the following is a specification.

This invention relates to improvements in periscopes and certain optical systems applicable thereto. Periscopes heretofore have involved many optical imperfections and inconveniences, some of which are common to optical systems in general, but others are characteristic of peculiar requirements in the structure and use of the periscope.

The inherent difficulties of periscope construction lie in the need of a working objective at the top of the instrument having as large an angle of view as is possible, and the necessity of transferring the image obtained by the use of this wide angle objective in a vertical direction down through the periscope through a somewhat complicated optical system and finally in presenting such image for view in a horizontal direction.

The final image must be clear and sharp over an angular view as great as the magnifying power permits, and must have superimposed upon it a reticle or image thereof and must be erect as looking through an ordinary terrestrial telescope. Moreover, the whole system must be so constituted that it will not suffer mechanical disarrangement by shock or vibration, nor be subject to leakage. Furthermore, it is extremely desirable to have available at least two magnifying powers, one taking in the widest practical field of view, and the other of a higher power for use in observation directed at some particular point as in launching a torpedo or the like.

The purpose of our invention is to overcome these objections and particularly to make possible the use of more than one magnifying power while so embodying the optical system as to be substantially proof against disarrangement. We furthermore propose to form the final image with a minimum loss of light and to make possible a reduction in the upper visible head of the periscope to avoid detection.

The construction of periscopes and periscopic systems in accordance with our invention will be more fully described and as illustrative thereof we have shown various forms well adapted to practical use. Throughout the specification and drawings like reference characters are employed to indicate corresponding parts and in the drawings:

Fig. 1 indicates a periscopic system in accordance with our invention.

Figure 5:
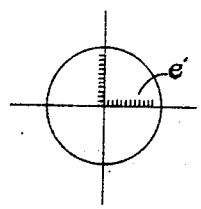
Fig. 5 illustrates an improved arrangement of reticle for avoiding loss of light.
Figure 5:
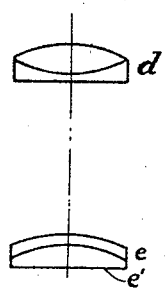

Fig. 5$^a$ is a lower face view of the reticle lens of Fig. 5.

Figs. 6, 7 and 8 modifications of detail of the eye end of said system.

Figure 11:
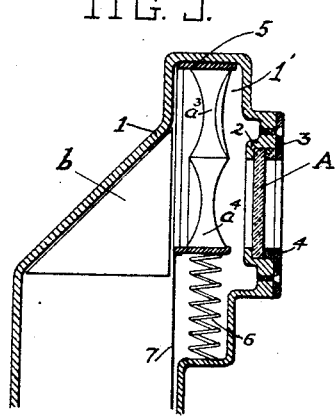

Fig. 9 a central vertical section of lens mounting,

Fig. 10 a plan view of lens and spacers, and Fig. 11 a detail of periscope head.

Figure 1:
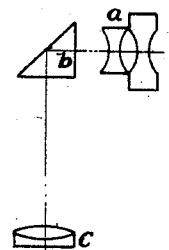

In Fig. 1 we have indicated the optical system of an improved form of periscope in accordance with our invention, having special reference to the decrease of the losses in transmission through the refracting system, and the obtaining of a plurality of powers from a single instrument.

We have indicated at $a$ the light receiving objective, shown in this instance as a triple combination consisting of two negative crown glass lenses with a flint lens between them. The right angled prism $b$ turns the rays downward. The positive lens $c$ renders substantially parallel the rays from the objective $a$ and is situated from it at a distance equal to the differences of focal lengths of the two.

The lenses $d$ and $e$ together form a positive refracting system producing an image of the field on the lower surface of the lens, $e$, upon which a reticle $e^1$ is ruled as shown in Fig. 5. The objective $f$ with the reticle $e^1$ in its principal focal plane renders substantially parallel the rays proceeding downward to the image forming objective $g$. A field lens $h$ may be employed for the viewing system, and a rectangular prism $i$ employed for turning the rays horizontally for view.

In the viewing system here shown, the eye lens $j$ cooperates with the field lens $h$ to form a so-called negative eye piece. A lens $k$ auxiliary to $j$ acts when shifted into the position indicated in dotted lines $k$ to form a system viewing as a positive eye piece the image plane established by $g$ and $h$.

Figure 2:
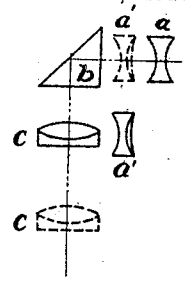

In Fig. 2 we have shown a periscope head adapted for providing two magnifying powers, in which there is a negative achromat $a$ of relatively long focal length, a reflecting prism $b$ and the parallelizing lens $c$ corresponding to the lens $c$ in Fig. 1. An achromatic negative combination $a^1$ is provided, which may be shifted into position as indicated in dotted lines $a^1$ concurrently with the shifting of the lens $c$ to its position as indicated in dotted lines to maintain the requisite distance between the focal lengths of the negative and positive elements of the combination. When $a^1$ is shifted into position the parallelizing lens $c$ is concurrently dropped into its position as indicated in dotted lines, and a higher negative power is given to the periscope head, and a lower power to the final magnification.

Figure 3:
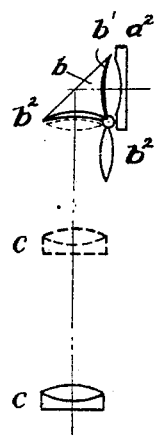

In Fig. 3 we have illustrated a further modification adapted for use in our improved periscope and consisting of a cover plate $a^2$ which may form part of the refracting system, and a right angled prism $b$ of which the hypothenuse surface is plane and the one or both of the two other corresponding surfaces are lenticular and achromatized. The parallelizing lens $c$ cooperates with a combination formed by $b^1$ and $b^2$. The lens $b^2$ as here shown is a positive lens which may be shifted or turned up into position indicated in dotted lines increasing the focal length of the top combination concurrently with the shifting of the parallelizing-lens $c$ to its position indicated in dotted lines to compensate for the change in focal length of the upper combination.

We may thus save still additional loss in reflection from air glass surfaces by forming the objective of a periscope head as a single structure with the reflecting prisms which turns the rays downward. In this arrangement the reflecting prism has a plane hypothenuse face, but on one or both of the corresponding surfaces we work a lenticular surface achromatized by the juxtaposition, preferably cemented, of an achromatizing lens of suitable curvature.

The lenticular surface on the prism may be either concave or convex without departing from the spirit of our invention. In the former case the prism becomes the negative element of the lens system and is achromatized by juxtaposed flint lenses of correspondingly less curvature as shown in Fig. 3, giving a combination of negative focus. If it is desired to make the exterior surface of the combination of crown glass, as would be desirable if that exterior surface itself formed the window in the periscope head, we may make the prism of flint glass with a convex surface, applying thereto a concave crown glass lens of greater power curvature so as to satisfy the conditions of achromatization. In case a form of periscope is desired in which the periscope head is a positive lens system instead of a Galilean system, we make the prism of crown glass with convex surface applying thereto a flint glass achromatizing lens or correspondingly of a flint glass with concave surface juxtaposed to a crown glass positive lens of greater power of curvature. These two form of positive lenses like the two forms of negative lenses just noted, correspond to the crown-ahead and flint-ahead forms of objective well known in the art, in each case, however, forms with at least one of the refracting surfaces in the face of the reflecting prism.

In this way the periscope head may be reduced to the smallest possible dimensions since there is no spacing between the lens elements to take up room and the window in the periscope head may be identical with one of the cemented refracting elements or with the face of the prism itself. Such a combined prism and objective may have its focal length suitably modified by an auxiliary lens as hereinbefore indicated, or may be used alone and the necessary changes in magnifying power, then made in the eye piece end of the periscope by any of the means herein set forth.

Figure 4:
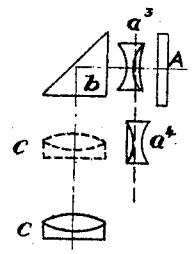
Figs. 2, 3 and 4 illustrate details of periscope head systems for giving a change of magnifying powers.

In Fig. 4 we have shown a modified two power head in which the cover glass A is provided for closing the window in the periscope head and two lenses $a^3$ and $a^4$ of different powers, may be selectively used. The rectangular reflecting prism $b$ is present as before and the positions of the parallelizing lens $c$ is indicated in solid and dotted lines respectively, corresponding to the two negative powers $a^3$ and $a^4$.

The optical combination shown in Fig. 5 projects the image into the field occupied by the reticle $e^1$. Here $d$ and $e$ are sectional component lenses, the reticle $e^1$ being ruled on the lower flat surface of the lens $e$ (Fig. 5$^a$).

In Fig. 6 is shown a combination system adapted to give a plurality of magnifying powers. In this the ordinary field lens is indicated at $h$ and a reflecting rectangular prism $i$ (or equivalent mirror) and ordinary eye lens $j$ is provided cooperating with the lens $h$ to view the image produced by the optical system above. An auxiliary lens $k^2$ is mounted for cooperation with the eye lens $j$ to produce a viewing system of greater magnifying power and is capable of being shifted into the optical axis of $j$ concurrently with the shifting of the auxiliary lens $l$ from its position as indicated in dotted lines into the field into the optical axis of $h$ as shown in full lines, where it will serve to lengthen the focus so as to bring the image of field and reticle into the focal plane of the lens combination $j-k^2$.

In Fig. 7 is shown a further modification comprising lenses $f$ and $g$ forming an image in the proper focal plane to be viewed through the right angled prism $i$ (or equivalent mirror) by the eye lens $k^3$. An independent viewing system K of shorter focus is adapted to be shifted into the optical axis previously occupied by $k^3$ concurrently with a shift of the lens $g$ into the position shown in dotted lines, bringing the principal image into the focal plane of K.

In the eye system shown in Fig. 8 the image forming objective is shown at $g$ and the reflecting prism at $i$ with the eye lens $k^4$ viewing the image for the low power.

An independent viewing system $K^2$ of focus for higher power may be shifted into the position of $k^4$ concurrently with the shifting of the image forming lens or lens system $g$ into its dotted line position, bringing the new focal plane of the image into the focal plane of $K^2$.

Obviously the same result may be accomplished by concurrently shifting the whole optical system which forms the final image, whether composed of one or more lenses, axially concurrently with the shifting of one or another image viewing system into the optic axis so that the image plane established by the former will fall in the focus of the latter.

The improved form of lens sealing which enables us to avoid the losses of light entailed by separated mutually achromatizing elements found in the ordinary periscope is shown in Fig. 9.

Here the crown glass lens $m$ is achromatized by the flint glass lens $n$. The combination as here shown is flint-ahead, although obviously the construction may be reversed. These lenses are fitted in the cell $o$ which is provided with an annular groove $p$ overlapping the joint between $m$ and $n$. The two lenses $m$ and $n$ are very slightly separated by the very thin spacers $s$, indicated at $s$ Fig. 10, which prevent the lenses sinking together by reason of the viscosity of the sealing medium between them and thus coming themselves into optical contact irregularly or regularly.

In sealing this lens combination, the space between the lenses $m$ and $n$ and the annulus $p$ surrounding them is filled with balsam or other suitable sealing material and the follower $q$ is screwed or otherwise pressed home upon the combination with a gasket $r$, so as to form a joint tight as respects the sealing material. The lenses $m$ and $n$ are thus held together with a sealing material between them and in the surrounding annulus so that a thin layer of this sealing material will always be maintained between the opposite surfaces of the lenses while the spacers prevent optical contact between the two lenses themselves or displacement of these lenses with respect to each other. The system is thus maintained in proper relation for accurate refraction and forms at the same time a tight seal against access of water to the space below the combination in case the upper portions of the periscope should leak.

The mechanical details of the mounting or assembling of our improvements is obviously subject to a great variety of modifications for different uses and different conditions.

A convenient form of head is illustrated in Fig. 11, in which the head system is employed corresponding to that diagrammatically illustrated in Fig. 4.

Here the periscope head 1 is fitted with the window A which is clamped against a shoulder 2 by a plate 3 and rubber gasket 4. The lenses $a^3$ and $a^4$ are held in a suitable frame 5 which slides in the head 1. The lens $a^3$ is normally pushed up into a recess $l^1$ in the head by means of a spring 6, thus bringing the lens $a^4$ into line with the window A. The frame 5 may be drawn down against the action of the spring 6 by a wire 7 running down through the tube of the periscope. This withdraws the lens $a^4$ from the front of the window and substitutes the lens $a^3$ for it. This illustrates a convenient head structure in which lenses of different powers are to be shifted or substituted. The various systems are capable of corresponding mechanical mountings for convenient manipulation.

These structures are merely suggestive as illustrative and many and other modifications may be resorted to all without departing from the spirit of our invention if within the limits of the appended claims.

What we therefore claim and desire to secure by Letters Patent is:

1. In a periscope, a light receiving objective, an auxiliary lens movable into or out of the optical axis of said objective to modify the focal length thereof, and a lens movable longitudinally of said focal axis to bring its principal focus into correlation with the thus established focus.

2. In a periscope, a light receiving system consisting of a fixed objective and a lens movably mounted relative to the axis thereof to modify its focal length, and a refracting system movably mounted with respect to said objective to establish a common focal plane with said objective system and to render substantially parallel the rays received from either of them.

3. In an image viewing system, a field lens, an auxiliary lens movably mounted for position relative thereto to vary the distance of resultant image plane with respect to the field lens, an eye lens, and an auxiliary lens movably mounted relative thereto to bring the resultant focal plane of the eye lens into the resultant focal plane established by the field lens and its auxiliary.

4. In an image viewing system, an image forming lens, an auxiliary lens mounted for movement relative thereto to shift the resultant focal plane thereby established, and a plurality of eye lens systems movably mounted for selective positionings to bring into focus the focal plane as established by said field lens and said auxiliary.

5. In a periscope, an eye piece comprising a field lens, an auxiliary lens movably mounted in cooperative relation with said field lens to establish a resultant image plane at a point below said field lens, an eye lens disposed to view the image plane in its original position, a lens system disposed to view the image plane in its resultant position, said auxiliary field lens and said eye lens system being concurrently movable into the optical axis of said periscope.

In testimony whereof we affix our signatures in presence of two witnesses.

LOUIS BELL.
C. A. ROBERT LUNDIN.

Witnesses:
MARION F. WEISS,
AGNES V. O'CONNELL.